United States Patent
Weksler et al.

(10) Patent No.: US 11,423,893 B2
(45) Date of Patent: Aug. 23, 2022

(54) RESPONSE TO SECONDARY INPUTS AT A DIGITAL PERSONAL ASSISTANT

(71) Applicant: Lenovo (Singapore) Pte. Ltd., Singapore (SG)

(72) Inventors: Arnold S. Weksler, Raleigh, NC (US); John Carl Mese, Cary, NC (US); Nathan J. Peterson, Oxford, NC (US); Mark Patrick Delaney, Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 109 days.

(21) Appl. No.: 16/735,362

(22) Filed: Jan. 6, 2020

(65) Prior Publication Data
US 2021/0210083 A1 Jul. 8, 2021

(51) Int. Cl.
*G10L 15/22* (2006.01)
*G10L 15/20* (2006.01)
*G06F 16/9032* (2019.01)

(52) U.S. Cl.
CPC ........ *G10L 15/22* (2013.01); *G06F 16/90332* (2019.01); *G10L 15/20* (2013.01); *G10L 2015/227* (2013.01)

(58) Field of Classification Search
CPC .................................................... G10L 15/22
See application file for complete search history.

(56) References Cited

U.S. PATENT DOCUMENTS

| 9,098,467 | B1* | 8/2015 | Blanksteen | G06F 3/167 |
| 10,134,395 | B2* | 11/2018 | Typrin | G10L 17/00 |
| 10,567,515 | B1* | 2/2020 | Bao | H04L 67/22 |
| 2015/0149182 | A1* | 5/2015 | Kalns | G10L 15/18 704/275 |
| 2018/0337962 | A1* | 11/2018 | Ly | G10L 15/30 |
| 2019/0080692 | A1* | 3/2019 | R | G10L 17/00 |
| 2020/0020333 | A1* | 1/2020 | Amores | B25J 11/0005 |
| 2020/0058308 | A1* | 2/2020 | Choi | G10L 15/22 |
| 2020/0160857 | A1* | 5/2020 | Alameh | G06F 3/167 |

OTHER PUBLICATIONS

Sugiyama, Takaaki, et al. "Estimating response obligation in multi-party human-robot dialogues." 2015 IEEE-RAS 15th International Conference on Humanoid Robots (Humanoids). IEEE, 2015. (Year: 2015).*

Xu, Qianli, Liyuan Li, and Gang Wang. "Designing engagement-aware agents for multiparty conversations." Proceedings of the SIGCHI Conference on Human Factors in Computing Systems. 2013. (Year: 2013).*

* cited by examiner

*Primary Examiner* — Jialong He
(74) *Attorney, Agent, or Firm* — Ference & Associates LLC

(57) ABSTRACT

One embodiment provides a method, including: receiving at a digital personal assistant coupled to an information handling device, while receiving a command from a first user, an input from a second user; determining that the input provided by the second user is directed at the first user; providing an indication indicating the command is directed to the digital personal assistant; and ignoring the input provided by the second user. Other aspects are described and claimed.

17 Claims, 3 Drawing Sheets

RESPONSE TO SECONDARY INPUTS AT A DIGITAL PERSONAL ASSISTANT

BACKGROUND

Digital assistants have become prevalent in modern society. The digital personal assistant allows a user to provide a command that will be performed by the digital assistant. Many user devices include some level of digital assistant software programmed within the device. For example, digital assistants may be purchased as a standalone piece of technology, may be installed in smart phones, may be present in some television/cable box associated remote controls, and the like. Multiple digital assistants can be present in a single environment and can be paired together when accepting commands or performing tasks. Digital assistant devices have become prevalent because of the hands-free nature that the technology provides, thereby allowing users to perform multiple tasks at the same time.

BRIEF SUMMARY

In summary, one aspect provides a method, comprising: receiving at a digital personal assistant coupled to an information handling device, while receiving a command from a first user, an input from a second user; determining that the input provided by the second user is directed at the first user; providing an indication indicating the command is directed to the digital personal assistant; and ignoring the input provided by the second user.

Another aspect provides an electronic device, comprising: a processor; a memory device that stores instructions executable by the processor to: receive, at a digital personal assistant coupled to an information handling device, while receiving a command from a first user, an input from a second user; determine that the input provided by the second user is directed at the first user; provide an indication to indicate the command is directed to the digital personal assistant; and ignore the input provided by the second user.

A further aspect provides a product, comprising: a storage device that stores code, the code being executable by a processor and comprising: code that receives, at a digital personal assistant coupled to an information handling device, while receiving a command from a first user, an input from a second user; code that determines that the input provided by the second user is directed at the first user; code that provides an indication indicating the command is directed to the digital personal assistant; and code that ignores the input provided by the second user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
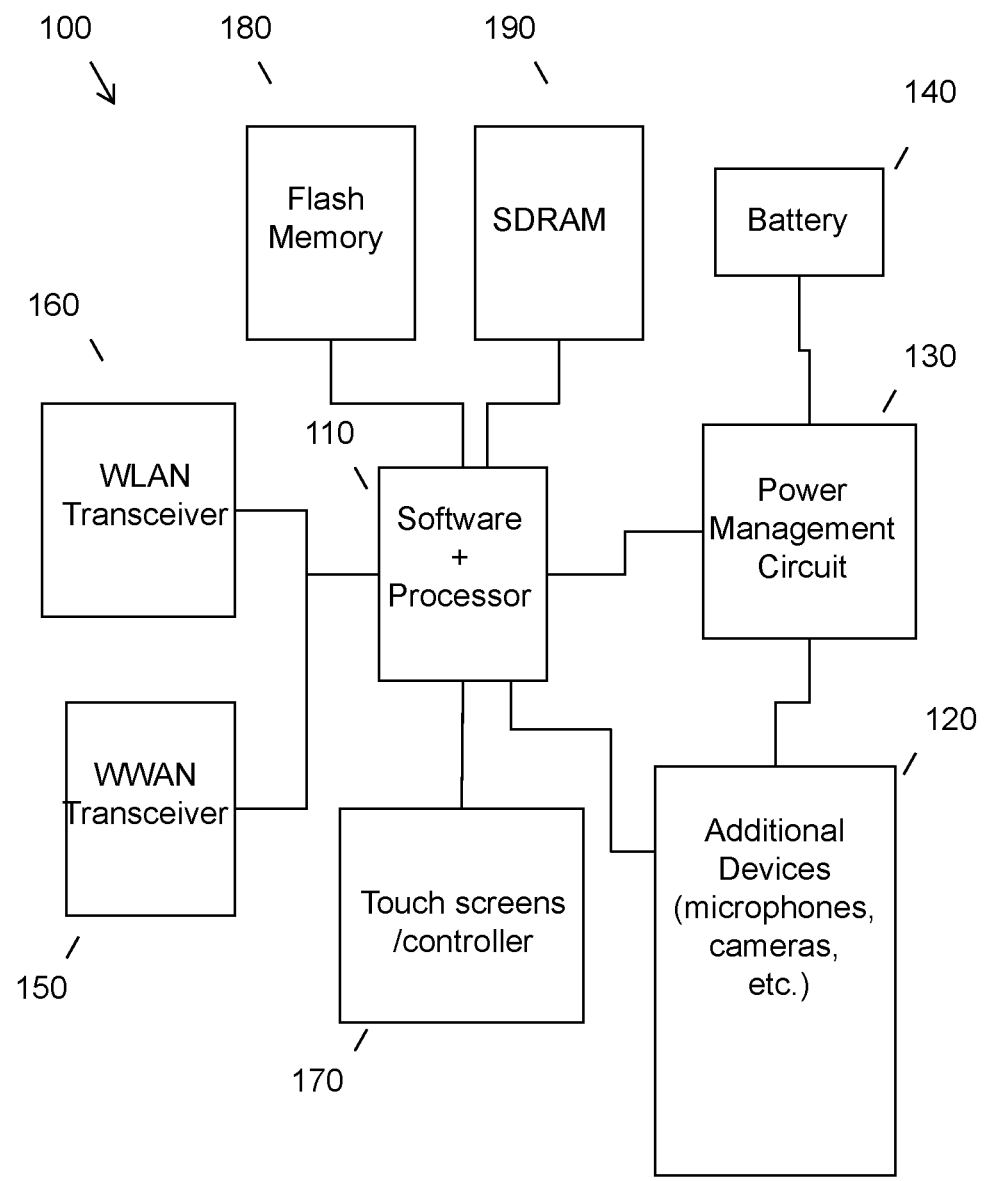
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Digital personal assistants (DPA), also referred to as digital assistants or virtual assistants, may receive input from a user in a variety of ways. The most common form of input includes utilizing voice command and recognition techniques. When a person is providing a command to a digital personal assistant, it can cause confusion in an environment where multiple people are present. Specifically, a second user may think that the first user providing a command to the digital assistant is talking to them. The second user then talks to the first person, thereby causing confusion by the DPA and the first person. In an attempt to clarify that the user providing the command to a DPA is in fact talking to the DPA, conventionally a user must provide a command to pause a response, tell the second person that the user was addressing a DPA, and then provide another command to resume playback of the response. Alternatively, the first user could simply ignore the second user while the second user inquiries about who the first user is talking to. Additionally, the DPA may receive both inputs at the same time and have issues in distinguishing the input, thereby requiring the first person to re-provide the command or input.

This confusion of who the user is talking to may also be present when the DPA is providing a response and a secondary user is unaware of the response being provided to the first user. In conventional DPA usage, if a secondary input is received while a DPA is still providing a response to a first user a system will stop the output associated with the first input immediately and move on to responding to the second input. This occurs regardless of whether or not the response to the first input is complete.

Accordingly, an embodiment provides a method for determining that a second user input is directed at a first user who is currently providing a command to a digital personal assistant and, thereafter, ignoring the second user input. In an embodiment, a system may recognize that a user is providing a command to the DPA. The input may be a command comprising a task to be performed by the DPA, a request for a response to a query, or any other command that may be issued to a DPA. The DPA may also, during receipt of the command by the first user, detect an input from a second user. After determining that the input from the second user is directed at the first user, the digital personal assistant may provide the second user with an indication identifying that the first user is addressing the DPA and not the second user. For example, a DPA may provide a secondary user with an audible notification saying "this system is already in use." Indications may be provided when a system pauses while providing a response, or may be provided without disrupting the response being provided to the first user by use of unique tone notifications, visual indications, and providing an audible indication to a secondary user from a different digital assistant present in a network.

The DPA may ignore the input provided by the second user, but may utilize information contained within or corresponding to the input to determine who is providing the input in order to determine whether the input should be ignored. Additionally, the substance of the input may be utilized to determine that the input is actually directed at the first user and not at the DPA, for example, if the second user input is "are you talking to me?" the DPA may recognize this as being directed to the first user by virtue of the input. Thus, a system and method may overcome user input recognition and response interruptions by utilizing a variety of recognition techniques to provide an indication to the second user that a first user is addressing the digital personal assistant.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering.

System 100 also typically includes various memory devices, for example flash memory 180 and SDRAM 190.

Figure 2:
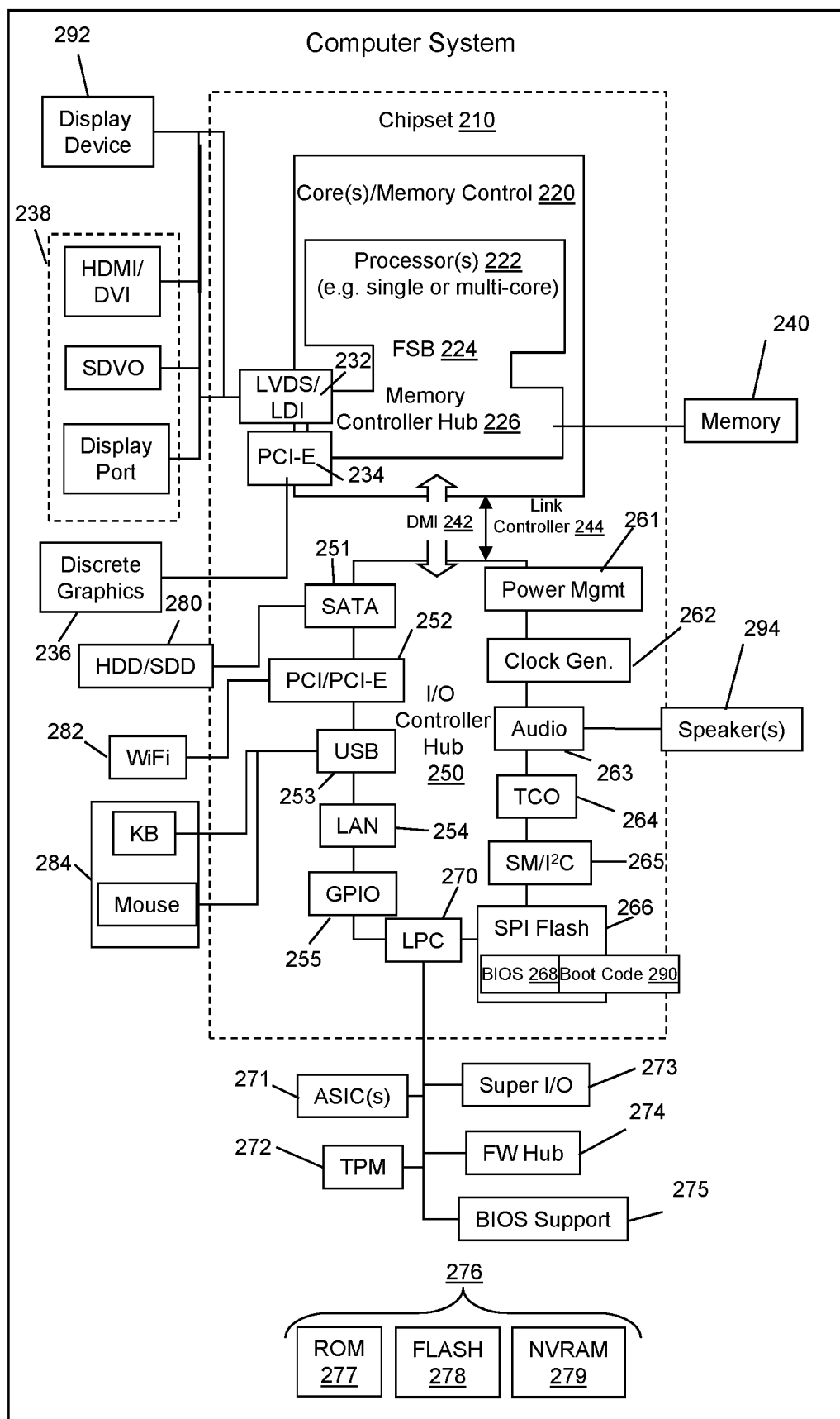
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices including digital personal assistants. For example, the circuitry outlined in FIG. 1 may be implemented in a laptop embodiment, whereas the circuitry outlined in FIG. 2 may be implemented in another computing source.

Figure 3:
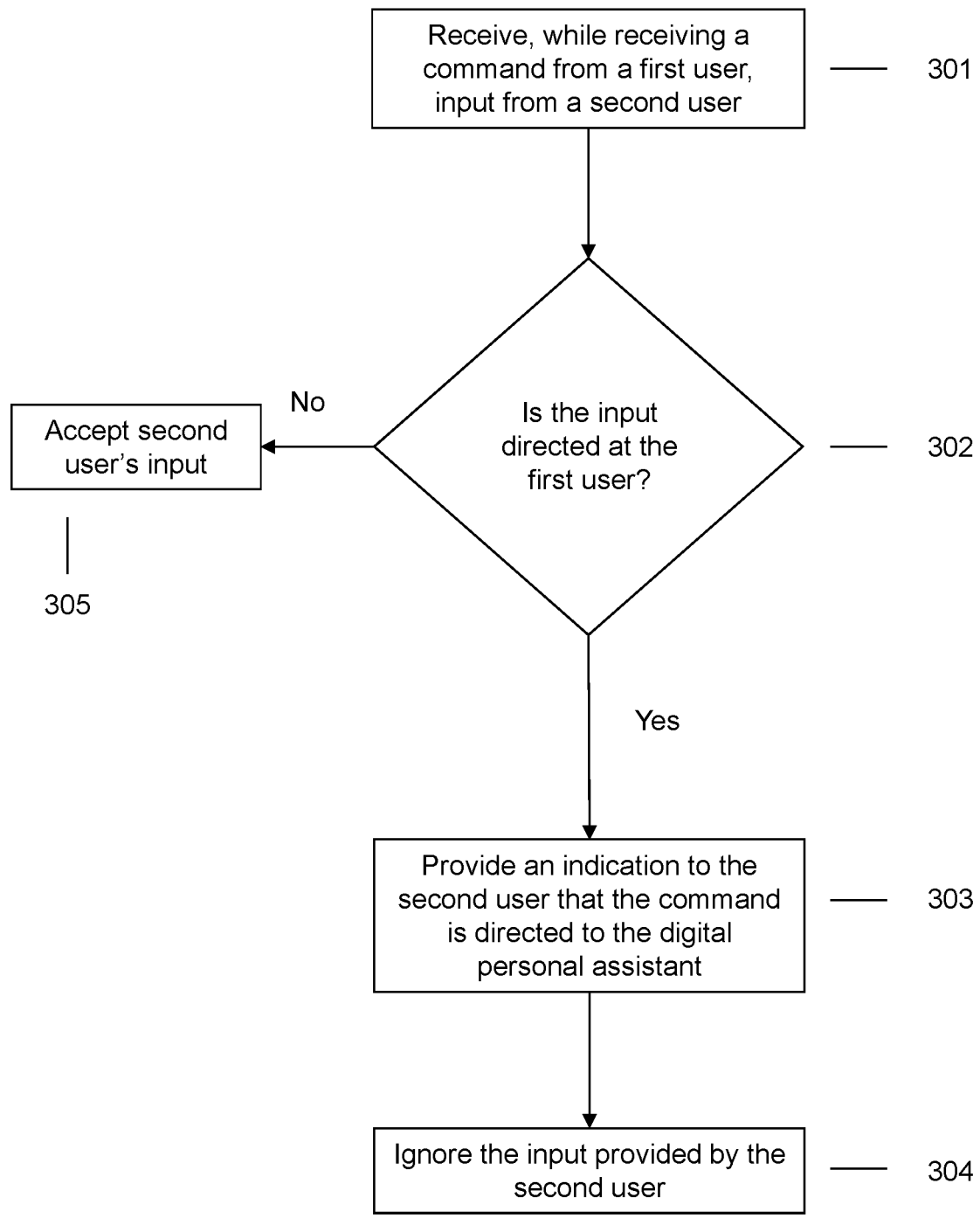
FIG. 3 illustrates an example method of determining that a second user input is directed at a first user who is currently providing a command to a digital personal assistant and, thereafter, ignoring the second user input.

Referring now to FIG. 3, a system is directed towards determining that a second user input is directed at a first user who is currently providing a command to a digital personal assistant and, thereafter, ignoring the second user input. A digital personal assistant may receive input from a user in a variety of ways, e.g., typing input, audible input, and the like. Throughout this application, audible input may be discussed as the primary form of input; however, a system is not limited to receipt of audible input. In an embodiment, a system may include multiple digital personal assistants, or multiple devices having digital personal assistants, that are all synched to the same network, so when a command is received at one device, one or multiple of the devices or DPAs are aware of the command and could provide a response.

In an embodiment, a device may be receiving a command from a first user or person. While receiving the command, or, stated differently, as the person is providing the command, the DPA or device may detect an input being provided by a second user, at 301. In an embodiment, the input provided by the second user may identify a sense of confusion of the second user. This confusion of the second user may occur when the first user is providing a command to the DPA, and a second user may think that the first user is addressing them. For example, as a first user is providing a command to the DPA, a second user may state a keyword or term such as "huh?" or "are you talking to me?" which indicates the second user is unaware if the first user is addressing them, another person, the DPA, or simply talking to themselves. For example, if a first user is providing a command to the DPA and, during provision of the command, a second user comes close enough to the first user to hear the user talking, the second user may think the first user is addressing them. The second user may then inquire to the first user to repeat what was said or ask if the first user was addressing them, not knowing that the first user is actually addressing the DPA. Alternatively, the second user may hear a response by a DPA to a first person and question the DPA regarding who the response was directed to.

At 302, a system may determine if the input provided by the second user is directed at the first user. In other words, the system may attempt to determine if the second user is questioning the first user talking, for example, by saying "are you talking to me?" or "huh?" In an embodiment, when it is determined that the input by the second user is not directed to a first user or other user and, instead being directed at the DPA, the DPA, at 305, may accept the second user's input as a command to the DPA and may, thereafter, perform some action in response to the second user's input.

In an embodiment to determine whether the input is directed at the first user, the system may utilize natural language processing techniques to parse the input provided by the second user. After parsing the input, the system may determine if the input contains one or more keywords. The keywords may be a prepopulated list of keywords or key phrases that provide an indication that someone is confused or attempting to figure out who a person is talking to, for example, "huh", "are you talking to me", "can you repeat that", and the like. The keyword list may be populated by a user and may also be populated using historical data. Utilizing historical data the system may determine that when a particular word or phrase is said, another user provides input indicating that the another user was not talking to the person. The system can learn this over time and identify these words or phrases as belonging to the keyword list. Additionally, the system may utilize a crowdsourcing technique to populate the keyword list by pulling information from many different users of DPAs.

A system may use additional sensors in determining who is providing input to a device. The system may determine, based upon who is providing the input, where the input is directed (e.g., at the DPA, at another person, etc.). In an embodiment, identifying a user that provides input to a device may utilize location information associated with each user in proximity to the digital personal assistant. For example, if a user providing input to a device is in closer proximity to the device than the second user, the system may assume that the input provided by the second user is directed to the first user. For example, if a first user is providing input to a device, they are likely in close proximity to the device to ensure the device captures all of the input. If a second user walks into the room, the second user may not recognize that the first user is close to the device and may, therefore, inquire about who the first user is talking to. In this scenario, the second user is likely a significant distance from the device and/or the first user as compared to the distance between the first user and the device. Thus, the location of the users within the space may provide an indication of who or what the second user input is directed to.

As another example, if a first user is providing a command to a device, and then an input is provided from a second user to the same device or a paired device within a network, a system may determine that the second input is being provided from a user in a different relative location then the first input, thus determining that the inputs were provided by separate users. The fact that the inputs are provided by different users may provide an indication of who or what each input is directed to. Thus, a system may utilize time and distance calculations to determine a distance radius in which a user providing inputs may be located within.

Additionally or alternatively, in an embodiment, a system may utilize voice recognition techniques to determine which user is providing input to a device. Voice recognition techniques may be trained over time to become more accurate in associating a voice with a user; moreover, voice recognition techniques may be able to quickly differentiate between user voices. In an embodiment, as a first user provides an input, a second may provide an audible input. After determining that the voice that provided the first input is different from the voice that provided the second input, a system may determine that the second input is likely not directed to the DPA or is directed to the first user. The described example techniques are merely illustrative and are not intended to be limiting, as there are a plurality of techniques that may be utilized in determining who or what input is being directed towards.

If the system determines that the input provided by the second user is being directed to the first user or not to the DPA, the system may provide an indication to the second user that the command being provided by the first user is being directed to the DPA and not to the second user at 303. In other words, the system may provide an indication to the second user the command by the first user is being directed to the digital personal assistant. The type of indication to be provided to the second user may be one of a variety of notifications or indications. In an embodiment, the type of indication provided to the second user may be predetermined by the user. For example, a particular user may want a particular modality of notification provided. In an embodiment, the indication provided to the second user may be associated with the type of command currently being provided by the first user. For example, a user may determine an indication type based on the length or complexity of the command. In another embodiment, a user may determine an indication type based on the type of output that a DPA is currently supplying. For example, the indication provided to the second user while music is being played by the digital personal assistant may be different than the indication supplied while a system is relaying the news or processing an order.

In an embodiment, the indication provided to a second user may be an audible output indicating that the first user is directing a command at the digital personal assistant. In another embodiment, the audible response provided to the second user may be provided from a different digital personal assistant present in a network. The use of a second device may allow for no interruption in the exchange between the first user and the DPA. An audible output may notify a second user that a system is in use by providing phrase to similar to, "this system is already in use" or that the first user is addressing the DPA by stating "user is talking to me." These are merely illustrative non-limiting examples. Versions of such a notification may be stored in a memory device and utilized when needed. In an embodiment having a singular digital personal assistant in a network, the system may pause the first user and address the second user with recognition of a second user input. An audible output directed towards the second user may be provided during this pausing. After the DPA addresses the second user, the system may provide a second audible output directed to the first user to carry on with the paused command that was previously disrupted by the second user input.

A system may utilize other types of notifications to provide indications that a DPA is in use or that the command being provided by a first user is directed towards a device. In an embodiment, the indication provided by a system to the second user may be an audible notification of a unique tone. This tone may be provided in lieu of pausing a conversational session between the first user and the digital personal assistant. Additionally or alternatively, in an embodiment, a visual indication may be provided to avoid pausing a conversational session, as well. For example, a device may provide a single "ding" to identify that the DPA is in use and the first user is addressing the DPA. Further, for example, a system may provide some type of color flashing or light ring to establish that the first user is addressing the DPA or that the DPA is in use. Utilizing these indication and notification techniques allows for a system to move forward without interrupting the conversational session between the first user and the digital personal assistant.

After the digital personal assistant provides an indication that the first user is addressing the DPA, any additional user input provided by the second user may be received but may be ignored at 304. The DPA may also ignore the second user input while the indication is being provided. For example, in the case that a non-interrupting indication is provided, the system can ignore the command while the non-interrupting indication is being provided. In an embodiment, the second user input may contain a command that the second user wishes to have completed. The second user input may be recognized by the digital personal assistant, as discussed previously, and treated simply as an event sensed by the DPA, but nothing more. In other words, the commanding information present in the second user input may be ignored and left incomplete when the input is received during a conversational session between a digital personal assistant in a network and the first user.

The various embodiments described herein thus represent a technical improvement to conventional methods for responding to secondary queries while addressing a primary query. Using the techniques described here, an embodiment may recognize a second input provided by a second user to a digital personal assistant that is already invested in a conversational session with a first user. A system provide an indication to the second user indicating that the DPA is currently in use, and may ignore commands present in the second user input. In an embodiment, a type of indication may be provided to a user dependent on the status of the response provided to, or conversational sessions with, the first user. Responsive to a system determining that the input provided to a system is directed to the first user, an embodiment may provide the indication to the second user by either pausing a session and notifying a second user that the system is working with the first user, or by using a non-interrupting indication method of unique tones, visual indications, and/or providing an audible response from a different digital personal assistant present in a network. Such an embodiment negates the conventional methods of disrupting digital personal assistant responses when additional inputs are recognized while a user is in conversation with the digital personal assistant.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving at a digital personal assistant coupled to an information handling device, while receiving a command from a first user during a conversational session between the first user and the digital personal assistant, an input from a second user;
determining, at the digital personal assistant and while engaged in the conversational session with the first user, that the input provided by the second user is directed at the first user and not at the digital personal assistant;
providing, from the digital personal assistant and while engaged in the conversational session with the first user, an audible output to the second user indicating the command provided by the first user is directed to the digital personal assistant and not to the second user, wherein the audible output to the second user does not interrupt the conversational session between the first user and the digital personal assistant and is provided using a second information handling device different from the information handling device; and
ignoring, at the digital personal assistant and while engaged in the conversational session with the first user, the input provided by the second user, wherein the ignoring the input comprises not performing an action corresponding to the input provided by the second user.

2. The method of claim 1, wherein the determining comprises identifying the input as corresponding to one of a plurality of keywords.

3. The method of claim 1, wherein the determining comprises identifying the input is provided by the second user who is different than the first user as determined utilizing a voice recognition technique.

4. The method of claim 1, wherein the determining comprises identifying the input is provided by the second user based upon a location of the second user with respect to a location of the first user and a location of the digital personal assistant.

5. The method of claim 1, wherein the providing the audible output comprises providing an audible output to the second user indicating the first user is directing the command at the digital personal assistant.

6. The method of claim 5, wherein the providing the audible output further comprises providing a second audible output directed to the first user to indicate the command should be continued by the first user.

7. The method of claim 1, wherein the providing the audible output comprises providing a unique tone from the digital personal assistant.

8. The method of claim 1, further comprising providing a visual indication from the digital personal assistant to the second user.

9. An electronic device, comprising:
a processor;
a memory device that stores instructions executable by the processor to:
receive, at a digital personal assistant coupled to an information handling device, while receiving a command from a first user during a conversational session between the first user and the digital personal assistant, an input from a second user;
determine, at the digital personal assistant and while in the conversational session with the first user, that the input provided by the second user is directed at the first user and not at the digital personal assistant;
provide, from the digital personal assistant and while engaged in the conversational session with the first user, an audible output to the second user to indicate the command provided by the first user is directed to the digital personal assistant and not to the second user, wherein the audible output to the second user does not interrupt the conversational session between the first user and the digital personal assistant and is provided using a second information handling device different from the information handling device; and
ignore, at the digital personal assistant and while engaged in the conversational session with the first user, the input provided by the second user, wherein the ignoring the input comprises not performing an action corresponding to the input provided by the second user.

10. The electronic device of claim 9, wherein to determine comprises identifying the input as corresponding to one of a plurality of keywords.

11. The electronic device of claim 9, wherein to determine comprises identifying the input is provided by the second user who is different than the first user as determined utilizing voice recognition technique.

12. The electronic device of claim 9, where to determine comprises identifying the input is provided by the second user based upon a location of the second user with respect to a location of the first user and a location of the digital personal assistant.

13. The electronic device of claim 9, wherein to provide the audible output comprises providing an audible output to the second user indicating the first user is directing the command at the digital personal assistant.

14. The electronic device of claim 13, wherein to provide the audible output further comprises providing a second audible output directed to the first user to indicate the command should be continued by the first user.

15. The electronic device of claim 9, wherein to provide the audible output comprises providing a unique tone from a digital personal assistant.

16. The electronic device of claim 9, further comprising providing a visual indication from the digital personal assistant to the second user.

17. A product, comprising:
 a storage device that stores code, the code being executable by a processor and comprising:
 code that receives, at a digital personal assistant coupled to an information handling device, while receiving a command from a first user during a conversational session between the first user and the digital personal assistant, an input from a second user;
 code that determines, at the digital personal assistant and while engaged in the conversational session with the first user, that the input provided by the second user is directed at the first user and not at the digital personal assistant;
 code that provides, from the digital personal assistant and while engaged in the conversational with the first user, an audible output to the second user indicating the command provided by the first user is directed to the digital personal assistant and not to the second user, wherein the audible output to the second user that does not interrupt the conversational session between the first user and the digital personal assistant and is provided using a second information handling device different from the information handling device; and
 code that ignores, at the digital personal assistant and while engaged in the conversational session with the first user, the input provided by the second user, wherein the ignoring the input comprises not performing an action corresponding to the input provided by the second user.

* * * * *